US008666371B2

(12) United States Patent
Yuba et al.

(10) Patent No.: US 8,666,371 B2
(45) Date of Patent: Mar. 4, 2014

(54) INFORMATION PROVIDING SYSTEM AND INFORMATION PROVIDING METHOD

(75) Inventors: Takashi Yuba, Shinagawa (JP); Shigemi Kurashima, Shinagawa (JP); Masahiro Yanagi, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1152 days.

(21) Appl. No.: 11/822,299

(22) Filed: Jul. 3, 2007

(65) Prior Publication Data

US 2008/0242275 A1 Oct. 2, 2008

(30) Foreign Application Priority Data

Mar. 27, 2007 (JP) ................................. 2007-082336

(51) Int. Cl.
*H04M 3/42* (2006.01)
(52) U.S. Cl.
USPC ... 455/414.1; 235/375; 235/383; 235/472.03; 705/14.64; 705/39
(58) Field of Classification Search
USPC ........ 455/414.1; 342/457; 705/1.1, 14, 14.64, 705/39; 235/375, 383, 472.03
See application file for complete search history.

(56) References Cited

U.S. PATENT DOCUMENTS

| | | | | |
|---|---|---|---|---|
| 5,420,606 A | * | 5/1995 | Begum et al. | 345/156 |
| 5,508,708 A | * | 4/1996 | Ghosh et al. | 342/457 |
| 5,979,757 A | * | 11/1999 | Tracy et al. | 235/383 |
| 6,199,753 B1 | * | 3/2001 | Tracy et al. | 235/375 |
| 6,550,672 B1 | * | 4/2003 | Tracy et al. | 235/383 |
| 6,587,835 B1 | * | 7/2003 | Treyz et al. | 705/14.64 |
| 6,595,417 B2 | * | 7/2003 | O'Hagan et al. | 235/383 |
| 6,609,113 B1 | * | 8/2003 | O'Leary et al. | 705/39 |
| 6,616,049 B1 | * | 9/2003 | Barkan et al. | 235/472.03 |
| 6,965,868 B1 | * | 11/2005 | Bednarek | 705/9 |
| 7,107,221 B1 | * | 9/2006 | Tracy et al. | 705/26 |
| 7,546,254 B2 | * | 6/2009 | Bednarek | 705/26 |
| 7,725,326 B1 | * | 5/2010 | Tracy et al. | 705/1.1 |
| 2005/0251440 A1 | * | 11/2005 | Bednarek | 705/10 |
| 2009/0222358 A1 | * | 9/2009 | Bednarek | 705/27 |

FOREIGN PATENT DOCUMENTS

| | | |
|---|---|---|
| JP | 2001-230877 | 8/2001 |
| JP | 2002-259683 | 9/2002 |
| JP | 2004-3884 | 1/2004 |
| JP | 2004-110805 | 4/2004 |
| JP | 2004-258009 | 9/2004 |
| JP | 2004-312639 | 11/2004 |
| JP | 2005-80100 | 3/2005 |
| JP | 2006-011617 | 1/2006 |
| JP | 2006-163728 | 6/2006 |

* cited by examiner

*Primary Examiner* — Wiliam D Cumming
(74) *Attorney, Agent, or Firm* — Staas & Halsey LLP

(57) ABSTRACT

An information providing system including a communication device; an information providing apparatus; and a mobile terminal device carried by a shopper to communicate by wireless communication with the communication device and to communicate via a network with the information providing apparatus. The information providing apparatus supplies information to the mobile terminal device via the network or via the communication device and the wireless communication.

15 Claims, 10 Drawing Sheets

| LOCATION | INFORMATION |
|---|---|
| p1 | D1 |
| : | : |
| pj | Dj | ness for shoppers are on the
INFORMATION PROVIDING SYSTEM AND INFORMATION PROVIDING METHOD

BACKGROUND OF THE INVENTION

1. Field of the Invention

The present invention generally relates to an information providing system and an information providing method. More particularly, the present invention relates to an information providing system and an information providing method for providing information for shoppers.

2. Description of the Related Art

Operators of shopping centers and supermarkets are eager to promote shoppers' willingness to buy, for example, by providing merchandise information when shoppers are on the premises and by providing information on new products and bargain sales when shoppers are outside of the premises. Patent document 1, for example, discloses a system that is designed to meet such a demand. In the disclosed system, a terminal device is mounted on a shopping cart and information on merchandise on the shelves is displayed on the terminal device according to the location of the shopping cart in a store.

Meanwhile, mobile phones have become widespread and most shoppers now carry mobile phones. Accordingly, many shoppers are willing to obtain information on merchandise, bargain sales, new products, etc. using their mobile phones.

Patent document 2 discloses a system that enables displaying merchandise information on mobile phones of shoppers or on personal computers mounted on shopping carts.

As another example, patent document 3 discloses a system using mobile phones. In the disclosed system, a shopper stores a shopping list in his/her mobile phone and connects the mobile phone to a display device on a shopping cart in a store to display the shopping list on the display device.

[Patent document 1] Japanese Patent Application Publication No. 2004-110805

[Patent document 2] Japanese Patent Application Publication No. 2006-11617

[Patent document 3] Japanese Patent Application Publication No. 2002-259683

However, the disclosed systems are designed to provide merchandise information only when shoppers are in stores and are not designed to actively provide promotional information such as bargain sales and new products even when shoppers are outside of stores.

SUMMARY OF THE INVENTION

The present invention provides an information providing system and an information providing method that substantially obviate one or more problems caused by the limitations and disadvantages of the related art.

Embodiments of the present invention provide an information providing system and an information providing method for providing information to mobile terminal devices.

According to an embodiment of the present invention, an information providing system includes a communication device; an information providing apparatus; and a mobile terminal device carried by a shopper and configured to communicate by wireless communication with the communication device and to communicate via a network with the information providing apparatus; wherein the information providing apparatus is configured to supply information to the mobile terminal device via the network or via the communication device and the wireless communication.

Another embodiment of the present invention provides an information providing method of supplying information from an information providing apparatus to a mobile terminal device carried by a shopper via a network or via a communication device and wireless communication. The information providing method includes the steps of supplying the information from the information providing apparatus to the mobile terminal device via the communication device and the wireless communication when the communication device and the mobile terminal device are able to communicate with each other by the wireless communication; and supplying the information from the information providing apparatus to the mobile terminal device via the network when the communication device and the mobile terminal device are unable to communicate with each other by the wireless communication.

DETAILED DESCRIPTION OF THE PREFERRED EMBODIMENTS

Preferred embodiments of the present invention are described below with reference to the accompanying drawings.

Figure 1:
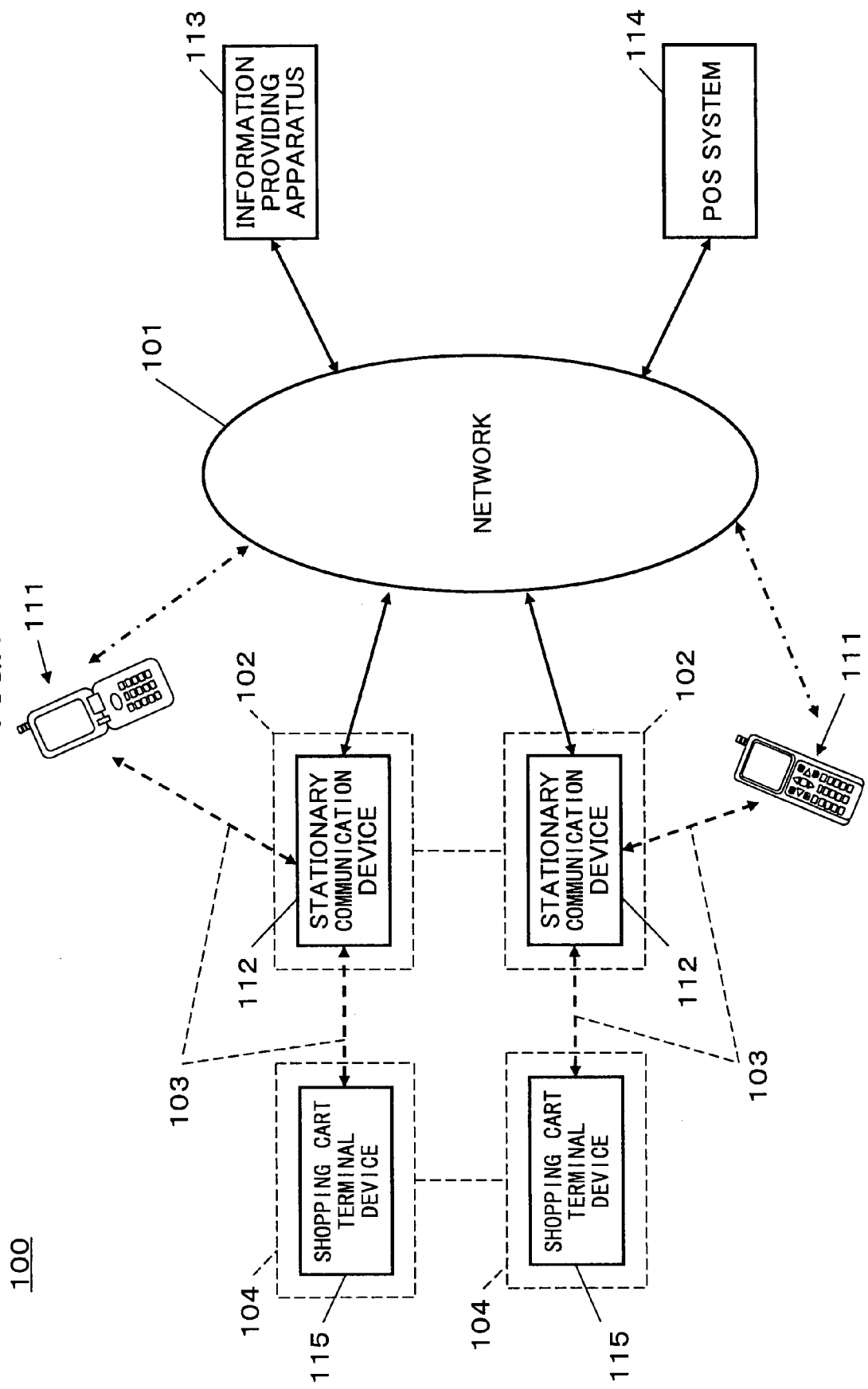
FIG. 1 is a drawing illustrating an exemplary configuration of an information providing system 100 according to an embodiment of the present invention.

FIG. 1 is a drawing illustrating an exemplary configuration of an information providing system 100 according to an embodiment of the present invention.

The information providing system 100 includes mobile terminal devices 111, stationary communication devices 112, an information providing apparatus 113, a POS system 114, and shopping cart terminal devices 115.

The mobile terminal devices 111 are carried by shoppers and can communicate with other devices via a network 101 or by short-range wireless communication 103. In this embodiment, ultra wideband (UWB) wireless communication channels are used as the short-range wireless communication 103.

The stationary communication devices 112 are attached to store shelves 102 in a store at certain intervals and can communicate with the mobile terminal devices 111 by the short-range wireless communication 103. The stationary communication devices 112 also detect locations of the mobile terminal devices 111 and send the location information to the information providing apparatus 113.

The information providing apparatus 113 is, for example, composed of a computer system and is connected to the network 101. The information providing apparatus 113 sends information to the mobile terminal devices 111 via the network 101 or via the stationary communication devices 112 and the short-range wireless communication 103.

Figure 2:
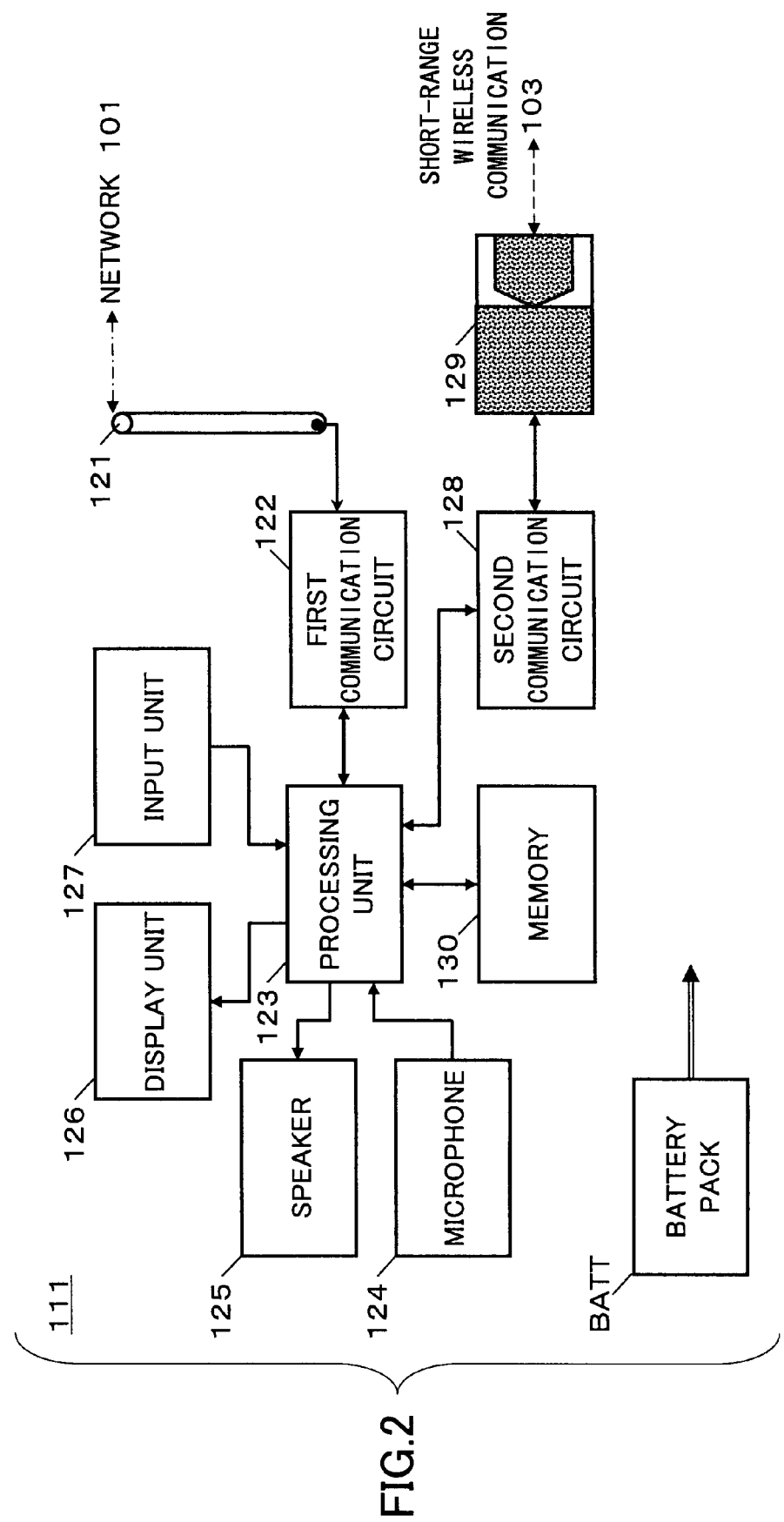
FIG. 2 is a block diagram illustrating an exemplary configuration of a mobile terminal device 111.

An exemplary configuration of the mobile terminal device 111 is described below. FIG. 2 is a block diagram illustrating an exemplary configuration of the mobile terminal device 111.

The mobile terminal device 111 is, for example, a mobile phone having a short-range wireless communication function. The mobile terminal device 111 includes an antenna 121, a first communication circuit 122, a processing unit 123, a microphone 124, a speaker 125, a display unit 126, an input unit 127, a second communication circuit 128, a UWB antenna 129, a memory 130, and a battery pack BATT.

The antenna 121 is connected to the first communication circuit 122 and is used for wireless communications with the network 101 (mobile communications network). The first communication circuit 122 performs modulation and demodulation processes and transmission control for communication with the network 101. The processing unit 123 performs voice processing and display processing according to installed programs.

The microphone 124 and the speaker 125 are used for voice input and output, for example, during a telephone call.

The display unit 126 is implemented, for example, by an LCD and displays information from the information providing apparatus 113. The input unit 127 includes keys and a pointing device and is used to enter, for example, commands and telephone numbers.

The second communication circuit 128 and the UWB antenna 129 are used for UWB wireless communications. The second communication circuit 128 is, for example, an IC chip for UWB wireless communications and performs modulation and demodulation processes and transmission control. The UWB antenna 129 sends and receives UWB radio waves.

Figure 3:
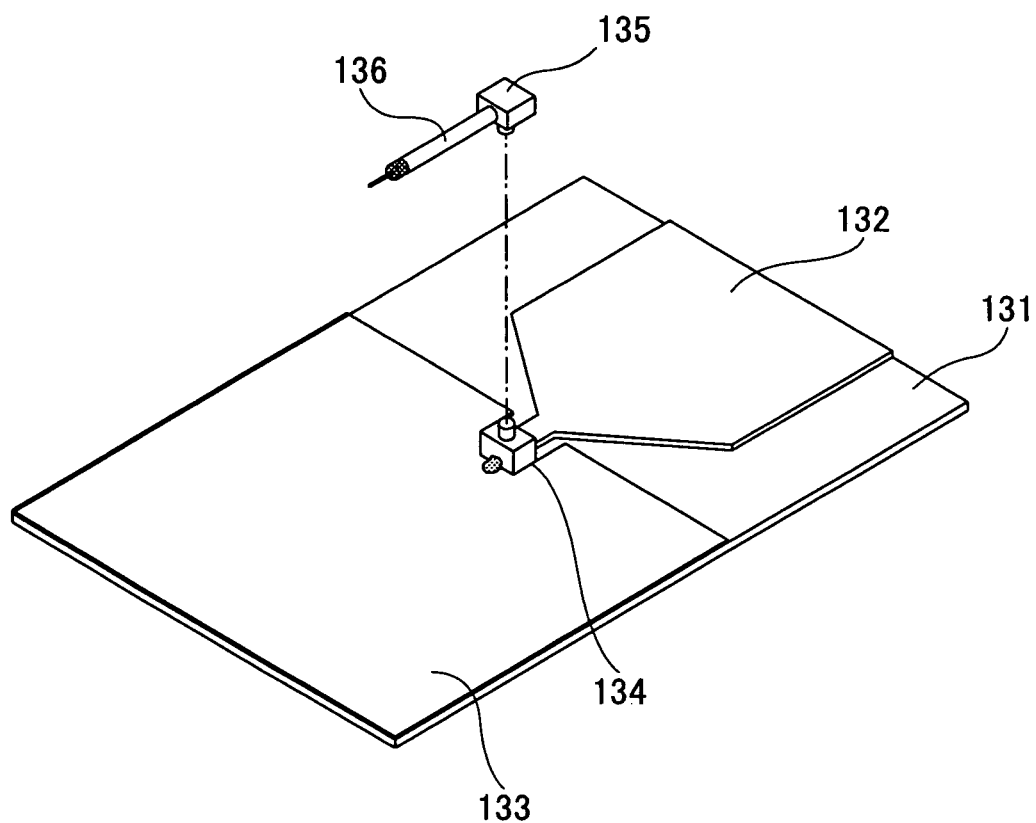
FIG. 3 is a perspective view of a UWB antenna 129.

FIG. 3 is a perspective view of the UWB antenna 129.

The UWB antenna 129 includes a flexible printed circuit board 131, an element pattern 132 and a ground pattern 133 formed on the flexible printed circuit board 131, and a surface mount socket connector 134 soldered onto the element pattern 132 and the ground pattern 133. The UWB antenna 129 is built into the mobile terminal device 111. A plug connector 135 is connected to the surface mount socket connector 134 and an end of a coaxial cable 136 is connected to the plug connector 135. The other end of the coaxial cable 136 is connected to the second communication circuit 128.

The memory 130 stores application programs, such as a communication program for short-range wireless communications, to be executed by the processing unit 123. When the communication program is running, the mobile terminal device 111 can communicate with the stationary communication devices 112 via the second communication circuit 128 and the UWB antenna 129. The battery pack BATT supplies a power supply voltage to other parts in the mobile terminal device 111.

Figure 4:
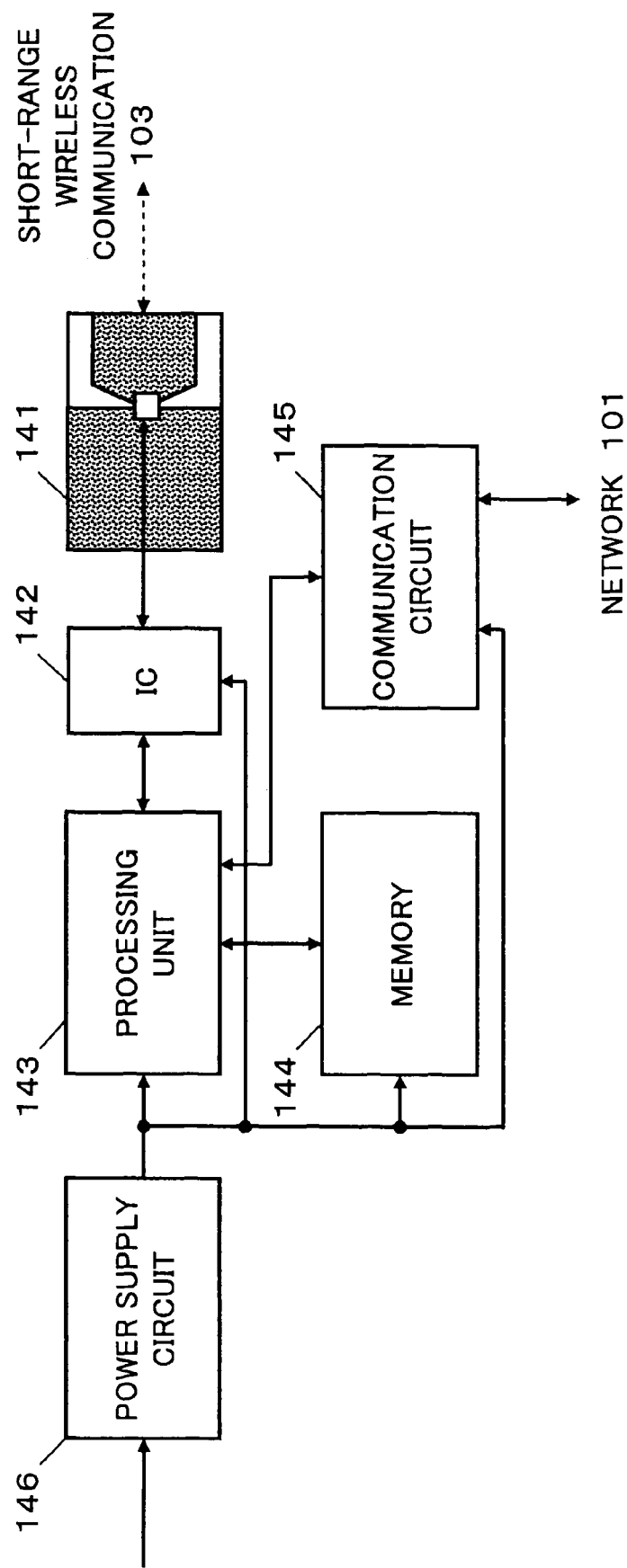
FIG. 4 is a block diagram illustrating an exemplary configuration of a stationary communication device 112.

An exemplary configuration of the stationary communication device 112 is described below. FIG. 4 is a block diagram illustrating an exemplary configuration of the stationary communication device 112.

The stationary communication devices 112 are attached to the store shelves 102 in a store and each of the stationary communication devices 112 includes a UWB antenna 141, a UWB communication IC chip 142, a processing unit 143, a memory 144, a communication circuit 145, and a power supply circuit 146.

The UWB antenna 141 has substantially the same configuration as that of the UWB antenna 129 shown in FIG. 3 and is used to send and receive UWB radio waves.

The UWB communication IC chip 142 has functions similar to those of the second communication circuit 128 and performs modulation and demodulation processes and transmission control for UWB wireless communications.

The processing unit 143 performs various processes according to a stationary communication device control program preinstalled in the memory 144.

The memory 144 is composed of a RAM and/or a ROM and stores the stationary communication device control program to be executed by the processing unit 143. The memory 144 is also used as working memory by the processing unit 143. The communication circuit 145 controls communications via the network 101 with the information providing apparatus 113 and the POS system 114.

The power supply circuit 146 is connected to an AC power supply and is configured to convert an alternating current from the AC power supply into a direct current and to supply the direct current to the UWB communication chip 142, the processing unit 143, the memory 144, and the communication circuit 145.

Figure 5:
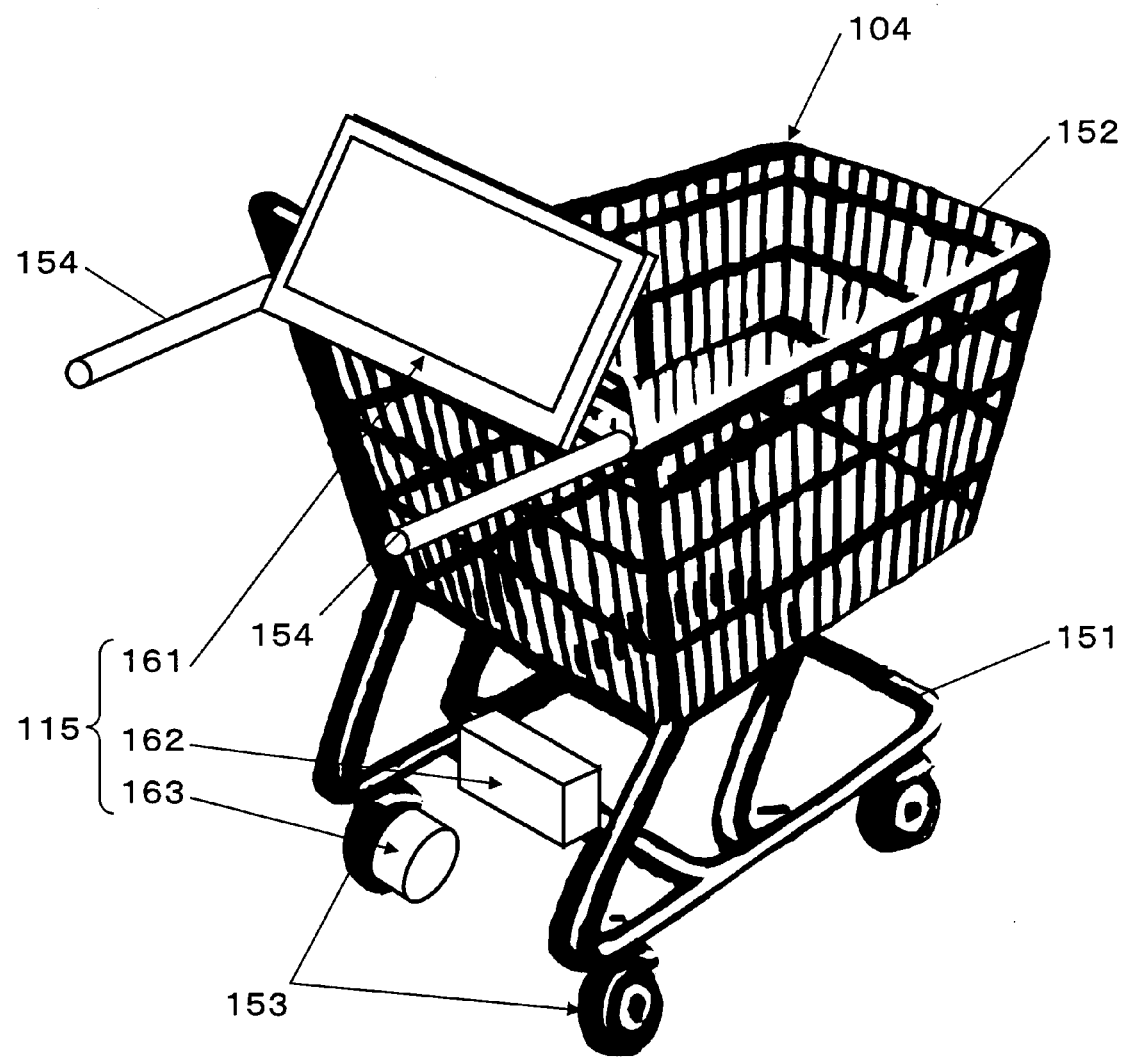
FIG. 5 is a perspective view of a shopping cart 101.
Figure 6:
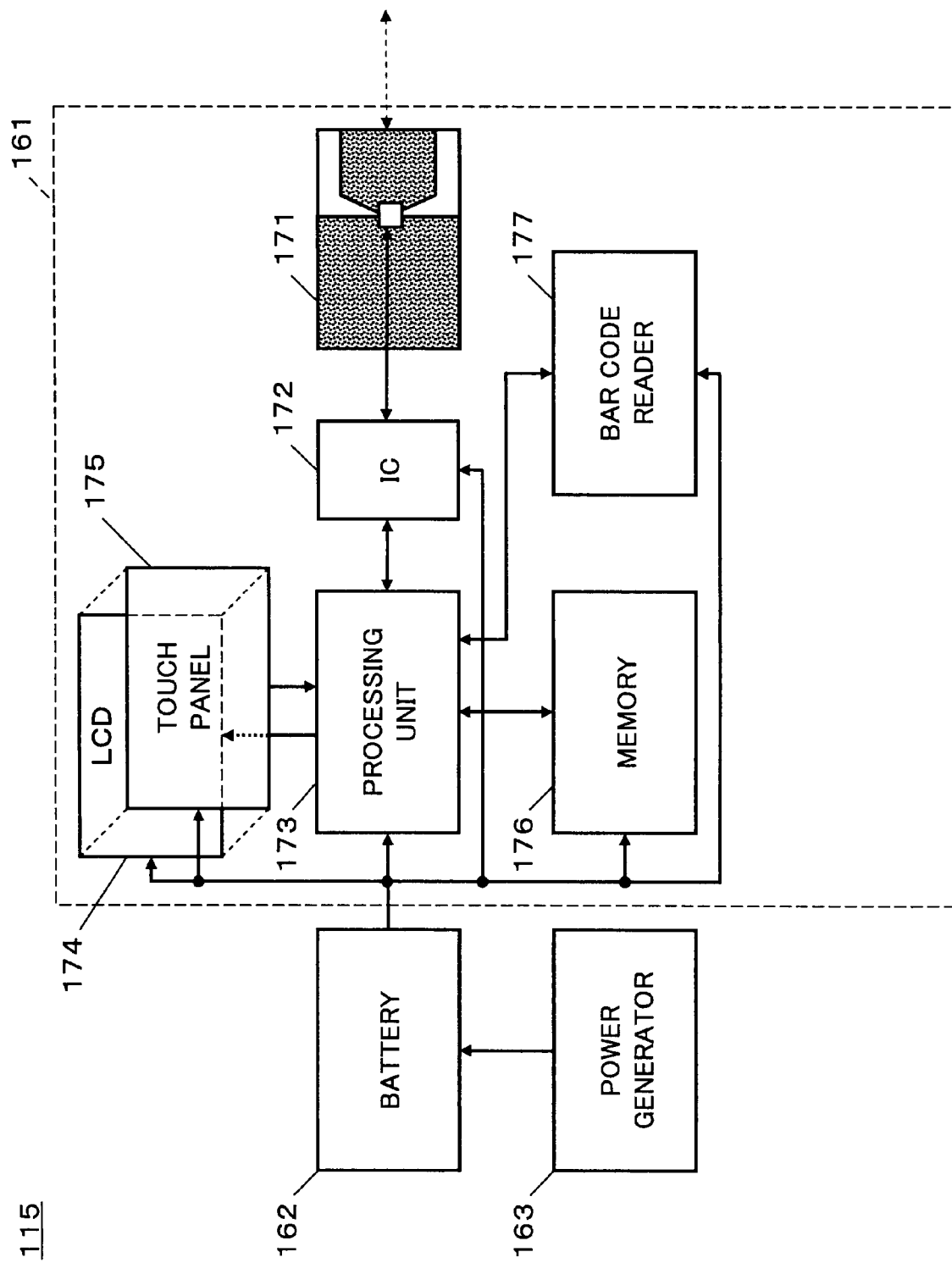
FIG. 6 is a block diagram illustrating an exemplary configuration of a shopping cart terminal device 115.

An exemplary configuration of a shopping cart 104 is described below. FIG. 5 is a perspective view of the shopping cart 104. FIG. 6 is a block diagram illustrating an exemplary configuration of the shopping cart terminal device 115.

The shopping cart 104 includes a base 151, a basket 152, wheels 153, and handles 154.

The shopping cart terminal device 115 is attached to the shopping cart 104 and therefore moves as a shopper walks around in a store.

The shopping cart terminal device 115 includes a main unit 161, a battery 162, and a power generator 163. The shopping cart terminal device 115 responds to response requests from the stationary communication devices 112, receives information sent from the information providing apparatus 113 via the stationary communication devices 112 based on the location and moving path of the shopping cart terminal device 115, and displays the received information on a display unit of the main unit 161. The main unit 161 includes a UWB antenna 171, a UWB communication IC chip 172, a processing unit 173, a display unit 174, a touch panel 175, a memory 176, and a bar-code reader 177.

The UWB antenna 171 has substantially the same configuration as that of the UWB antenna 129 shown in FIG. 3 and used for UWB wireless communications with the stationary communication devices 112.

The processing unit 173 performs various processes according to a shopping cart terminal device control program. The display unit 174 is implemented, for example, by an LCD and displays information from the information providing apparatus 113. The display unit 174 is controlled by the processing unit 173.

The touch panel 175 is disposed on the front side of the display unit 174 and is operated by a shopper. The processing unit 173 performs various processes according to instructions entered via the touch panel 175.

The memory 176 is composed of a RAM and/or a ROM and stores the shopping cart terminal device control program to be executed by the processing unit 173. The memory 176 is also used as working memory by the processing unit 173.

The bar-code reader 177 reads bar codes pasted or printed on merchandise and sends the bar code information to the processing unit 173. The processing unit 173 communicates with the information providing apparatus 113 and obtains merchandise information corresponding to the bar-code information. Also, the processing unit 173 may be configured to communicate with the POS system 114 and to charge the prices of merchandise corresponding to the bar-code information. Linking the shopping cart terminal device 115 with the POS system 114 makes it possible for a shopper to pay for the purchases while shopping without going to a checkout counter.

The battery 162 is mounted on the base 151 and supplies electricity to the main unit 161. The power generator 163 converts rotational motion of the wheel 153 into electricity. The electricity generated by the power generator 163 is supplied to the battery 162. Thus, the battery 162 is charged by electricity supplied from the power generator 163.

Figure 7:
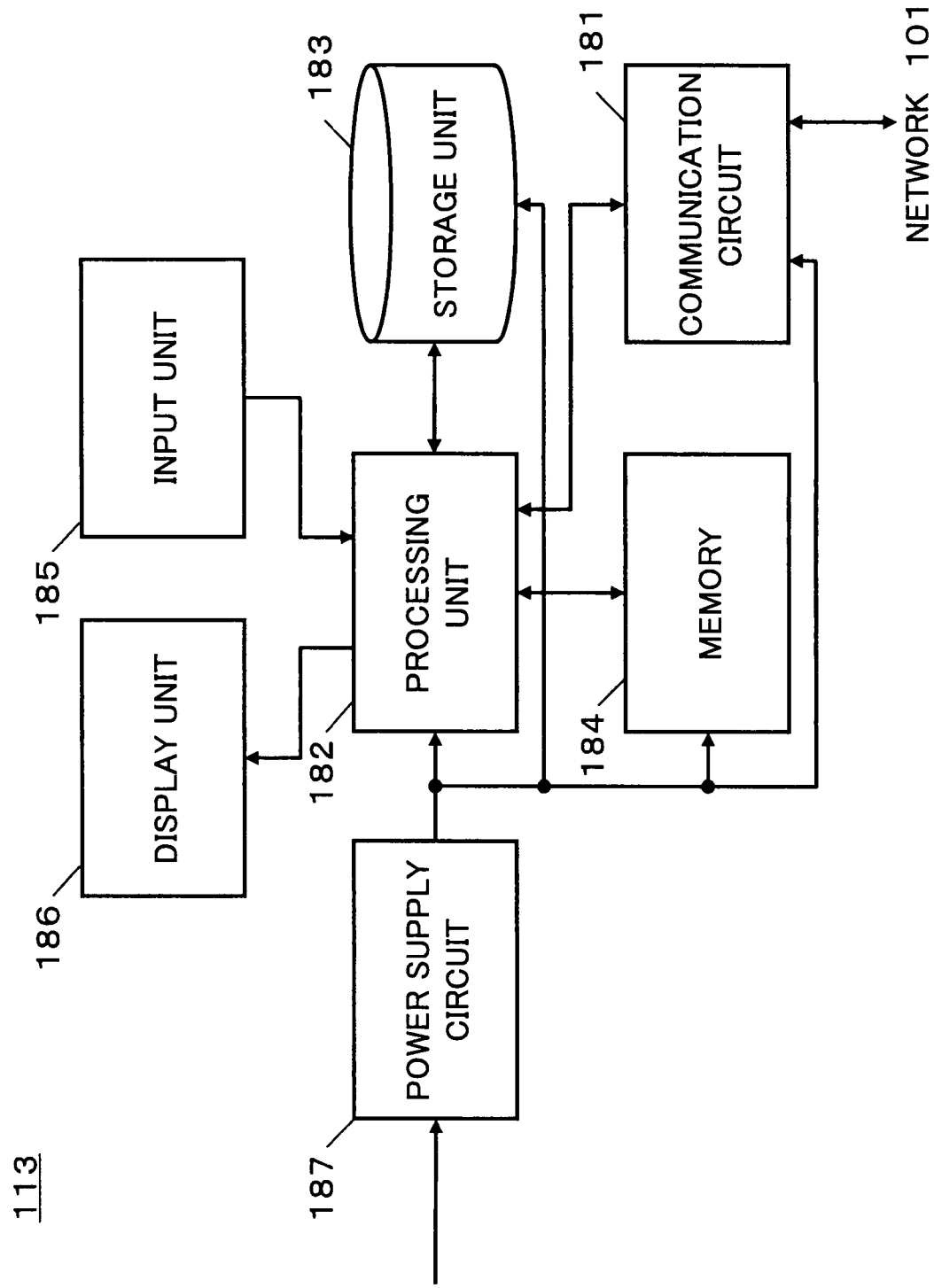
FIG. 7 is a block diagram illustrating an exemplary configuration of an information providing apparatus 113.

An exemplary configuration of the information providing apparatus 113 is described below. FIG. 7 is a block diagram illustrating an exemplary configuration of the information providing apparatus 113.

The information providing apparatus 113 is implemented by a computer system and includes a communication circuit 181, a processing unit 182, a storage unit 183, a memory 184, an input unit 185, a display unit 186, and a power supply circuit 187.

The communication circuit 181 controls communications via the network 101 with the information providing apparatus 113 and the POS system 114.

The processing unit 182 performs various processes according to a moving path management program preinstalled in the storage unit 183.

The storage unit 183 is, for example, implemented by a hard disk drive and stores an information providing program and the moving path management program. The storage unit 183 also stores location information of the mobile terminal devices 111 which location information is calculated according to the moving path management program based on response time of the mobile terminal devices 111 sent from the stationary communication devices 112.

The memory 184 is composed of a RAM and/or a ROM and is used as working memory by the processing unit 182.

The input unit 185 includes, for example, a mouse and a keyboard, and is used to input commands and data.

The display unit 186 is implemented, for example, by an LCD or a CRT and displays graphical screens sent from the processing unit 182.

The power supply circuit 187 is connected to an AC power supply and is configured to convert an alternating current from the AC power supply into a direct current and to supply the direct current to the communication circuit 181, the processing unit 182, the storage unit 183, and the memory 184.

Figure 8:
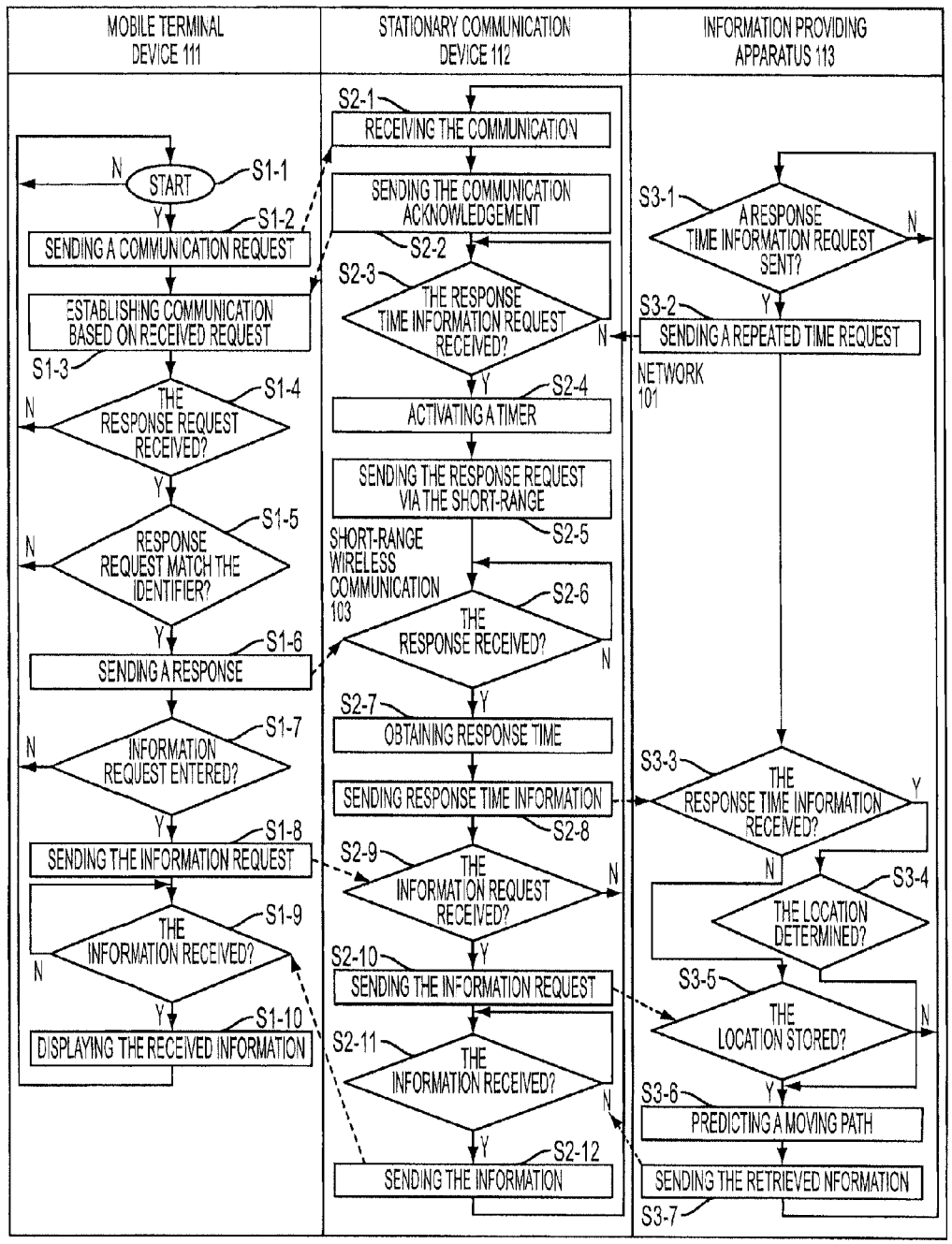
FIG. 8 is a sequence chart illustrating an exemplary process in the information providing system 100.

An exemplary process in the information providing system 100 is described below. FIG. 8 is a sequence chart illustrating an exemplary process in the information providing system 100.

In the descriptions of the exemplary process below, it is assumed that the mobile terminal device 111 is a mobile phone being carried by a shopper. When the communication program of the mobile terminal device 111 is started by the shopper in a store (step S1-1), the mobile terminal device 111 sends a communication request to the stationary communication device 112 in step S1-2.

When receiving the communication request in step S2-1, the stationary communication device 112 sends a communication enabling acknowledgement to the mobile terminal device 111 in step S2-2.

The mobile terminal device 111 receives the communication enabling acknowledgement, and communication with the stationary communication device 112 is established in step S1-3.

Meanwhile, in steps S3-1 and S3-2, the information providing apparatus 113 sends a response time information request via the network 101 to the stationary communication device 112 repeatedly at certain intervals. The response time information request includes the identifier of a target mobile terminal device 111.

When receiving the response time information request from the information providing apparatus 113 in step S2-3, the stationary communication device 112 activates an internal timer and sends a response request via the short-range wireless communication 103 in step S2-5. The response request includes the identifier of the target mobile terminal device 111.

When receiving the response request from the stationary communication device 112 in step S1-4, the mobile terminal device 111 determines whether the identifier in the response request matches the identifier assigned to itself in step S1-5. If the identifiers match in step S1-5, the mobile terminal device 111 sends a response to the stationary communication device 112 by the short-range wireless communication 103 in step S1-6. Using the short-range wireless communication 103 to send the response makes it possible to precisely measure the response time and thereby to precisely determine the location of the mobile terminal device 111.

When receiving the response from the mobile terminal device 111 in step S2-6, the stationary communication device 112 obtains response time by referring to the time measured by the internal timer in step S2-7. Then, in step S2-8, the stationary communication device 112 sends response time information including the obtained response time and the identifier of the responded mobile terminal device 111 via the network 101 to the information providing apparatus 113.

When receiving the response time information from the stationary communication device 112 in step S3-3, the information providing apparatus 113 determines the location of the responding mobile terminal device 111 based on the response time information in step S3-4.

Figures 9, 10:
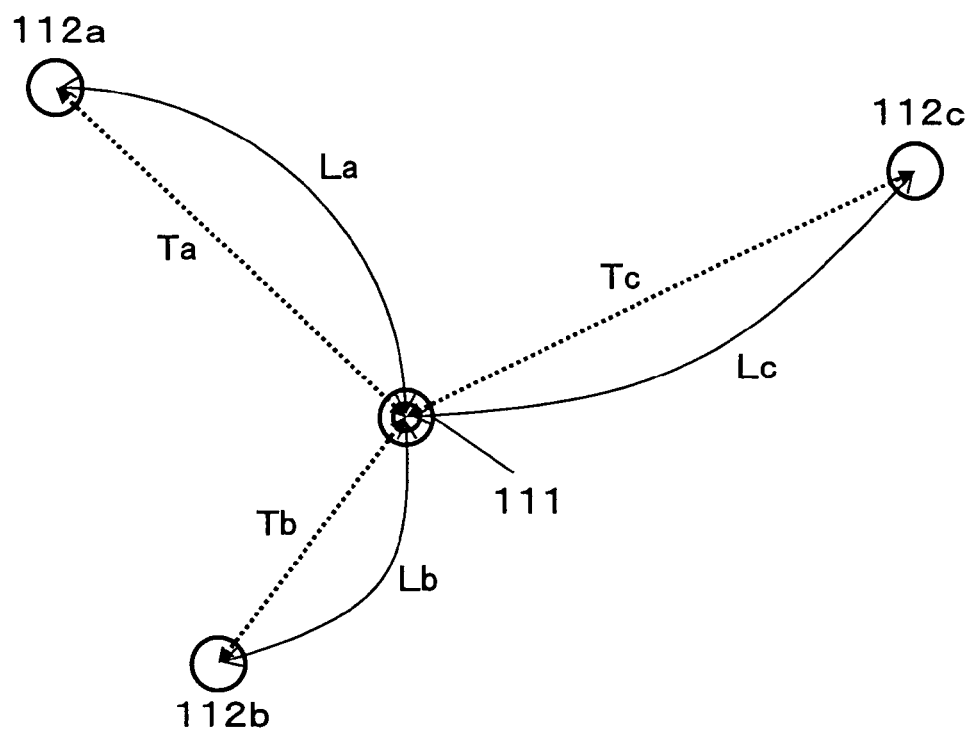
FIG. 9 is a drawing used to describe an exemplary method of determining the location of the mobile terminal device 111.
FIG. 10 is a table showing an exemplary configuration of an information providing database.

FIG. 9 is a drawing used to describe an exemplary method of determining the location of the mobile terminal device 111.

Let's assume that the mobile terminal device 111 sends responses to three stationary communication devices 112a, 112b, and 112c and the stationary communication devices 112a, 112b, and 112c obtain response times Ta, Tb, and Tc, respectively. The response time Ta corresponds to a distance La between the stationary communication device 112a and the mobile terminal device 111, the response time Tb corresponds to a distance Lb between the stationary communication device 112b and the mobile terminal device 111, and the response time Tc corresponds to a distance Lc between the stationary communication device 112c and the mobile terminal device 111.

Since the locations (or the coordinates) of the stationary communication devices 112a, 112b, and 112c are fixed, the distances La, Lb, and Lc can be obtained from the response times Ta, Tb, and Tc. Accordingly, the location (or the coordinates) of the mobile terminal device 111 can be obtained based on the distances La, Lb, and Lc and the locations of the stationary communication devices 112a, 112b, and 112c. Each of the stationary communication devices 112 is preferably equipped with a location detecting device such as a GPS device for detecting its location and configured to report the detected location (coordinates) to the information providing apparatus 113.

After determining the location of the mobile terminal device 111 in step S3-4, the information providing apparatus 113 stores the location information in the storage unit 183 in step S3-5.

Also, in step S3-6, the information providing apparatus 113 predicts the moving path of the mobile terminal device 111 based on the current location and the previous location of the mobile terminal device 111 and retrieves appropriate information from an information providing database stored in the storage unit 183 based on the predicted moving path. Then, in step S3-7, the information providing apparatus 113 sends the retrieved information to the stationary communication device 112.

FIG. 10 is a table showing an exemplary configuration of the information providing database.

The information providing database contains information items D1 through Dj associated with locations p1 through pj in the store. Examples of information items D1 through Dj include advertisements, discounts, merchandise information, and store information.

When receiving the information from the information providing apparatus 113 in step S2-11, the stationary communication device 112 sends the information to the mobile terminal device 111 in step S2-12.

The mobile terminal device 111 receives the information from the stationary communication device 112 in step S1-9 and displays the received information on the display unit 126 in step S1-10.

Figure 11A:
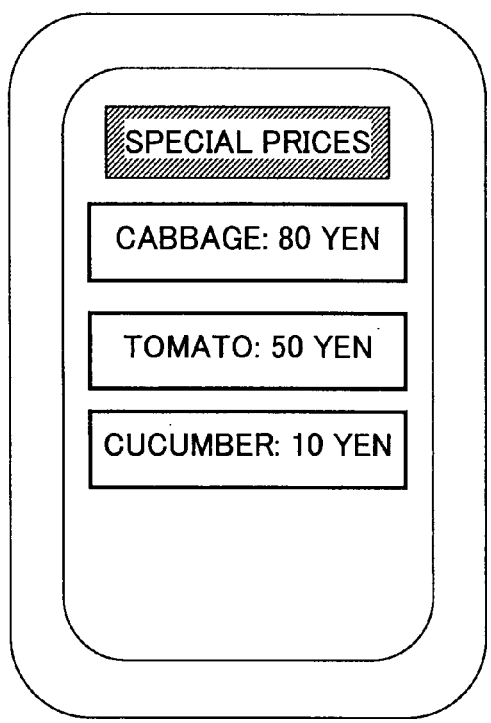
FIGS. 11A and 11B are drawings illustrating exemplary screens displayed on a display unit 126.
Figure 11B:
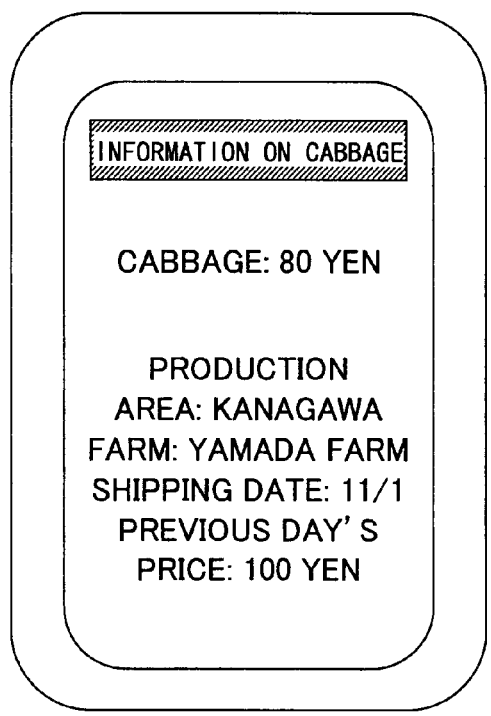

FIGS. 11A and 11B are drawings illustrating exemplary screens displayed on the display unit 126. FIG. 11A shows a menu screen and FIG. 11B shows a detailed merchandise information screen.

The mobile terminal device 111 receives information from the information providing apparatus 113 depending on its location. For example, the mobile terminal device 111 receives a menu screen as shown in FIG. 11A.

When a shopper selects, for example, "cabbage" on the menu screen via the input unit 127, a detailed merchandise information screen as shown in FIG. 11B is displayed.

Thus, with the information providing system 100, a shopper can display information such as merchandise information and store information on the display unit 126 of his/her own mobile terminal device 111 and thereby easily find and buy desired merchandise.

Also, a shopper can request information using the mobile terminal device 111. When a shopper enters an information request via the input unit 127 in step S1-7 shown in FIG. 8, the mobile terminal device 111 sends the information request to the stationary communication device 112 in step S1-8.

When receiving the information request from the mobile terminal device 111 in step S2-9, the stationary communication device 112 sends the information request to the information providing apparatus in step S2-10.

The information providing apparatus 113 receives the information request from the stationary communication device 112 in step S3-5, retrieves information from the information providing database based on the information request in step S3-6, and sends the retrieved information to the stationary communication device 112 in step S3-7.

When receiving the information from the information providing apparatus 113 in step S2-11, the stationary communication device 112 sends the information to the mobile terminal device 111 in step S2-12.

The mobile terminal device 111 receives the information from the stationary communication device 112 in step S1-9 and displays the received information on the display unit 126 in step S1-10.

The shopping cart 104 may be equipped with a charger/holder for charging and holding the mobile terminal device 111. The charger/holder makes it possible to obtain information from the information providing apparatus 113 while charging the mobile terminal device 111.

Although the mobile terminal device 111 is used to obtain information from the information providing apparatus 113 in the exemplary process described above, information can also be obtained from the information providing apparatus 113 using the shopping cart terminal device 115 in substantially the same manner.

In this embodiment, the mobile terminal device 111 is implemented by a mobile phone and configured to communicate with the information providing apparatus 113 via the network 101. With this configuration, promotional information such as bargain sales, new products, etc., can be supplied from the information providing apparatus 113 via the network 101 to the mobile terminal device 111 when the mobile terminal device 111 is outside of the communication range of the short-range wireless communication 103. Also, a shopper may use the mobile terminal device 111 to request information from the information providing apparatus 113 via the network 101.

Thus, using mobile phones of shoppers as the mobile terminal devices 111 improves the usability of the information providing system 100.

In this embodiment, the mobile terminal device 111, when it is in a store, receives information from the information providing apparatus 113 via the stationary communication device 112. Alternatively, the mobile terminal device 111 may be configured to receive information from the information providing apparatus 113 via the shopping cart terminal device 115 and the stationary communication device 112. Also, the shopping cart terminal device 115 may be equipped with another short-range wireless communication interface such as a BLUETOOTH™ short range wireless communication protocol interface in addition to the UWB wireless communication interface. BLUETOOTH™ is a trademark of Bluetooth SIG, Inc. In this case, for example, the BLUETOOTH™ interface is used for communications with the mobile terminal device 111 and the UWB wireless communication interface is used for communications with the stationary communication device 112. This configuration makes it possible to use, for example, widely-available Bluetooth-enabled mobile devices as the mobile terminal devices 111.

An embodiment of the present invention provides an information providing system configured to supply information to a mobile terminal device by short-range wireless communication when the mobile terminal device is within the range of the short-range wireless communication and to supply information to the mobile terminal device via a network when the mobile terminal device is outside of the range of the short-range wireless communication. Such an information providing system makes it possible to provide shoppers inside and outside a store with information such as bargain sales and merchandise information.

Another embodiment of the present invention provides an information providing system configured to determine the location of a mobile terminal device in a store by short-range wireless communication and to supply information to the mobile terminal device according to the determined location. Such an information providing system makes it possible to provide shoppers with information that matches their needs and thereby to improve customer service.

The present invention is not limited to the specifically disclosed embodiments, and variations and modifications may be made without departing from the scope of the present invention.

The present application is based on Japanese Priority Application No. 2007-082336 filed on Mar. 27, 2007 with the Japanese Patent Office, the entire contents of which are hereby incorporated herein by reference.

What is claimed is:

1. An information providing system, comprising:
a plurality of communication devices each provided in a different location in a store;
an information providing apparatus including a database to store information items each of which is associated with a certain location in the store; and
a mobile terminal device carried by a shopper and configured to communicate by wireless communication with the communication devices and to communicate via a network with the information providing apparatus,
wherein each of the communication devices is configured to send a response request to the mobile terminal device that is communicating with a corresponding communication device, to measure a response time between a timing when the response request is sent from the communication device to the mobile terminal device and a timing when a response to the response request is received from the mobile terminal device, and to send the measured response time to the information providing apparatus with the information indentifying the mobile terminal device;
wherein the information providing apparatus is configured to determine a location of the mobile terminal device based on response times received from the plurality of communication devices, to retrieve an information item associated with the determined location of the mobile terminal device from the database, and to supply the retrieved information item to the mobile terminal device;
wherein when the wireless communication is established between the mobile terminal device and one or more of the communication devices, the mobile terminal device receives the information item associated with the location of the mobile terminal device via the one or more of the communication devices and the wireless communication from the information providing apparatus; and
wherein when the wireless communication with the communication devices is not available, the mobile terminal device receives an information item other than the information item associated with the location of the mobile terminal device via the network from the information providing apparatus.

2. An information providing method of supplying information from an information providing apparatus to a mobile terminal device carried by a shopper via both a network and via one or more of communication devices and wireless communication, comprising:
supplying the information from the information providing apparatus to the mobile terminal device via the one or more of the communication devices, each communication device being provided in a different location in a store;
storing information items each of which is associated with a certain location in the store;
sending a response request from one or more of the communication devices to the mobile terminal device that is communicating with a corresponding communication device;
measuring a response time between a timing when the response request is sent from the communication device to the mobile terminal device and a timing when a response to the response request from the mobile terminal device is received by one or more of the communication devices;
sending the measured response time from one or more of the communication devices to the information providing apparatus with the information indentifying the mobile terminal device;
determining a location of the mobile terminal device based on response times received from the plurality of communication devices, to retrieve an information item associated with the determined location of the mobile terminal device from the database; and
supplying the retrieved information from the information item providing apparatus to the mobile terminal device,
wherein when the wireless communication is established between the mobile terminal device and one or more of the communication devices, the mobile terminal device receives the information item associated with the location of the mobile terminal device via the one or more of the communication devices and the wireless communication from the information providing apparatus; and
wherein when the wireless communication with the communication devices is not available, the mobile terminal device receives an information item other than the information item associated with the location of the mobile terminal device via the network from the information providing apparatus.

3. An information providing system, comprising:
a mobile terminal device configured to communicate via a network and wireless communication;
a communication device configured to communicate via the wireless communication with the mobile terminal device; and
an information providing apparatus configured to supply information via the network to the mobile terminal device and to supply information via the communication device and the wireless communication to the mobile terminal device,
wherein the mobile terminal device is configured to send a wireless communication request to the communication device to receive information from the information providing apparatus;
wherein when the wireless communication is established between the mobile terminal device and the communication device, the communication device obtains location information for identifying a location of the mobile terminal device and sends the location information to the information providing apparatus, and the mobile terminal device receives information associated with the location of the mobile terminal device via the communication device and the wireless communication from the information providing apparatus; and
wherein when the wireless communication with the communication device is not available, the mobile terminal device receives information other than the information associated with the location of the mobile terminal device via the network from the information providing apparatus.

4. The information providing system as claimed in claim 1, wherein the wireless communication is short-range wireless communication.

5. The information providing system as claimed in claim 4, wherein the short-range wireless communication is ultra wideband wireless communication.

6. The information providing system as claimed in claim 1, wherein the mobile terminal device is a mobile phone.

7. The information providing system as claimed in claim 1, wherein the information providing apparatus is configured to supply the information to the mobile terminal device via one or more of the communication devices and the wireless communication when one or more of the communication devices and the mobile terminal device are able to communicate with each other by the wireless communication.

8. The information providing system as claimed in claim 1, wherein the mobile terminal device has a communication program stored therein for the wireless communication and becomes capable of communicating with one or more of the communication devices when the communication program is executed.

9. The information providing system as claimed in claim 1, wherein the information providing apparatus is configured to supply information to the mobile terminal device based on a request from the mobile terminal device.

10. The information providing method as claimed in claim 2, wherein the wireless communication is short-range wireless communication.

11. The information providing method as claimed in claim 10, wherein the short-range wireless communication is ultra wideband wireless communication.

12. The information providing method as claimed in claim 2, wherein the mobile terminal device is a mobile phone.

13. The information providing method as claimed in claim 2, wherein the information is supplied from the information providing apparatus to the mobile terminal device via one or more of the communication devices and the wireless communication when a communication program for the wireless communication is executed on the mobile terminal device.

14. The information providing method as claimed in claim 2, wherein the information is supplied from the information providing apparatus to the mobile terminal device based on a request from the mobile terminal device.

15. The information providing system as claimed in claim 4, wherein stationary devices are attached to store shelves in a store at certain intervals, and the stationary devices are enabled to communicate with the mobile terminal device by a short-range wireless communication.

* * * * *

UNITED STATES PATENT AND TRADEMARK OFFICE
CERTIFICATE OF CORRECTION

PATENT NO. : 8,666,371 B2
APPLICATION NO. : 11/822299
DATED : March 4, 2014
INVENTOR(S) : Yuba et al.

It is certified that error appears in the above-identified patent and that said Letters Patent is hereby corrected as shown below:

In the Claims

Column 9, Line 29, In Claim 1, delete "indentifying" and insert -- identifying --, therefor.
Column 10, Line 9, In Claim 2, delete "indentifying" and insert -- identifying --, therefor.

Signed and Sealed this
Third Day of June, 2014

Michelle K. Lee
*Deputy Director of the United States Patent and Trademark Office*